(12) United States Patent
Park et al.

(10) Patent No.: US 7,567,609 B2
(45) Date of Patent: Jul. 28, 2009

(54) SPACE-TIME MULTIUSER DETECTOR IN MOBILE COMMUNICATION SYSTEM AND METHOD THEREOF

(75) Inventors: Jin-soo Park, Yongin-si (KR);
Hwan-min Kang, Suwon-si (KR);
Seong-soo Lee, Suwon-si (KR);
Sung-ho Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 591 days.

(21) Appl. No.: 11/346,376

(22) Filed: Feb. 3, 2006

(65) Prior Publication Data
US 2006/0172708 A1  Aug. 3, 2006

(30) Foreign Application Priority Data
Feb. 3, 2005  (KR)  ...................... 10-2005-0010102

(51) Int. Cl.
*H04L 27/30*  (2006.01)
(52) U.S. Cl. .................. 375/144; 375/148; 375/267; 375/346; 455/501; 455/63.1; 455/65; 455/67.13; 455/296
(58) Field of Classification Search .................. 375/144, 375/148, 260, 267, 285, 346, 349; 370/464, 370/465, 478, 480; 455/501, 63.1, 65, 67.11, 455/67.13, 132, 134, 135, 226.1–226.3, 296, 455/304
See application file for complete search history.

(56) References Cited

U.S. PATENT DOCUMENTS

| | | | | |
|---|---|---|---|---|
| 6,032,026 A | * | 2/2000 | Seki et al. | .................. 455/63.1 |
| 7,263,132 B2 | * | 8/2007 | Horng et al. | ................. 375/267 |
| 7,266,157 B2 | * | 9/2007 | Sim et al. | .................... 375/267 |
| 7,394,860 B2 | * | 7/2008 | Tong et al. | ................... 375/267 |
| 2006/0050770 A1 | * | 3/2006 | Wallace et al. | |

* cited by examiner

*Primary Examiner*—Dac V Ha
(74) *Attorney, Agent, or Firm*—Sughrue Mion, PLLC

(57) ABSTRACT

A space-time multiuser detector simultaneously reduces multiple access interference (MAI) and multipath channel distortion (MCD) that are disadvantages of mobile communication systems. The space-time multiuser detector includes a plurality of receiving antennas; a channel estimator which estimates signals received via the receiving antennas; a space-time diversity decoder which performs space-time decoding with respect to the signals provided from the channel estimator and performs diversity combination; a signal aligner which aligns the signals provided from the space-time diversity decoder; and a successive interference cancellation detector which generates an interference signal from the signals that are provided from the signal aligner one by one in sequence, and removes the interference signal from the received original signals.

15 Claims, 3 Drawing Sheets

SPACE-TIME MULTIUSER DETECTOR IN MOBILE COMMUNICATION SYSTEM AND METHOD THEREOF

CROSS-REFERENCE TO RELATED APPLICATIONS

This application claims the benefit under 35 U.S.C. §119(a) from Korean Patent Application No. 2005-10102 filed on Feb. 3, 2005, in the Korean Intellectual Property Office, the entire disclosure of which is incorporated herein by reference.

BACKGROUND OF THE INVENTION

1. Field of the Invention

Methods and apparatuses consistent with the present invention relate to multiuser detection with time diversity and space diversity, and more specifically, relate to a space-time multiuser detector for simultaneously removing multiple access interference (MAN) and multipath channel interference that occur in multiple access systems such as code division multiple access (CDMA) systems.

2. Description of the Related Art

Most of current mobile communication systems suffer performance degradation due to multipath channel interference. Such degradation can be resolved using transmit diversity. At an initial stage, multiple transmitting antennas are used to execute transmit diversity, or, both multiple transmitting antennas and multiple receiving antennas are used to efficiently enhance transmit diversity and receive diversity for space-time. Thus, it is possible to avoid attenuation caused by multipath channel interference.

Commercially available code division multiple access (CDMA) scheme in conformity to Interim Standard 95 (IS-95) has limitations in the enhancement of speech quality and capacity of subscribers as the number of users increases. To overcome such limitations, various algorithms have been proposed to suppress multiuser interference.

Multiuser detection algorithms can be categorized into a linear multiuser detection algorithm and a subtractive interference cancellation detection algorithm. The linear multiuser detection algorithm includes a decorrelator and a minimum mean-square error (MMSE) detection algorithm. The subtractive interference cancellation detection algorithm includes a successive interference cancellation (SIC) detector and a parallel interference cancellation (PIC) detector. Hereafter, the multiuser detection algorithms are explained in sequence.

The decorrelator is similar to a zero-forcing equalizer used for removing intersymbol interference. The decorrelator removes the interference signal by taking an inverse matrix of a matrix built with a correlation value of code sequences of each user. However, the decorrelator is disadvantageous in that the number of computations drastically increases as the number of users increases since the decorrelator needs to acquire the inverse matrix. In addition, the noise increment is disadvantageous as the decorrelator conducts multiplication of the inverse matrix, rather than suppressing multiple access interference.

The MMSE detector minimizes mean-square error between actual data and a soft output of a conventional detector. However, the MMSE detector, which is transformed from the correlation matrix, needs to estimate an amplitude of a received signal. Additionally, as the capacity of the MMSE detector depends on the power of an interference user, loss due to near-far problems may arise and the inverse matrix is similarly required for the decorrelator.

The subtractive interference cancellation detection algorithm suppresses the multiuser interference with respect to the received signal in a serial or parallel manner, unlike the linear detector. The SIC detector detects signals in the descending order from the highest user power received, newly generates MAI components using the detected signals, and removes the generated MAI components from the original received signal in sequence. The SIC detector features very simple hardware configuration, but lengthens the delay time as the number of users increases.

The PIC detector suppresses the MAI components in parallel, differently from the SIC detector. Hence, the delay time can be reduced but the complex hardware configuration is hard to realize.

Currently, space-time multiuser detection algorithms having multiple transmitting and receiving antennas have been proposed to simultaneously suppress multipath channel interference and multiuser interference. A representative example of the space-time multiuser detection algorithms may incorporate the decorrelation algorithm, which is one of the linear multiuser detection algorithms, and the MMSE detection algorithm, when the multiple transmitting and receiving antennas are employed.

FIG. 1 is a block diagram of a multiple transmitting and receiving antenna system adopting a conventional space-time code. In the multiple transmitting and receiving antenna system, a transmitting end includes a space-time transmit diversity (STTD) encoder 100 and a plurality of transmitting antennas 102 and 104. A receiving end includes a plurality of receiving antennas 110 and 112, channel estimators 114 and 116, and a STTD decoder 118.

Symbols x1 and x2, passing through processes for transmitting data, such as channel encoding and interleaving, are input to the STTD encoder 100. The STUD encoder 100 encodes the input symbols x1 and x2 according to the STUD encoding. The STTD encoding of the input symbols at the STTD encoder 100 is explained below. First, the input symbols x1 and x2 are encoded according to the STTD encoding operation and output as the encoded symbols (x1, x2) and (−x2*, x1*). For instance, (x1, x2) output from the STTD encoder 100 is fed to the first transmitting antenna 102, and (−x2*, x1*) is fed to the N-th (N=2) transmitting antenna 104. The symbols output from the transmitting antennas 102 and 104 are received at the receiving antennas 110 and 112. Specifically, the symbol output from the first transmitting antenna 102 is received by the first receiving antenna 110 through the N-th receiving antenna 112. The symbol output from the N-th transmitting antenna 104 is received by the first receiving antenna 110 through the N-th receiving antenna 112. In other words, the first receiving antenna 110 receives all the symbols (x1, x2), (−x2*, x1*) received from the first transmitting antenna 102 and the N-th transmitting antenna 104, and the N-th receiving antenna 112 receives all the symbols (x1, x2), (−x2*, x1*) received from the first transmitting antenna 102 and the N-th transmitting antenna 104.

The symbol arriving at the first receiving antenna 110 is provided to the channel estimator 114, and the symbol arriving at the N-th receiving antenna 112 is provided to the channel estimator 116. The channel estimators 114 and 116 estimate the channels through which the received symbols have been transmitted, from the respective antennas. The STTD decoder 118 performs the STTD decoding of the received symbols by applying the estimated channel characteristics that are provided from the channel estimators 114 and 116. That is, the STTD decoder 118 performs STTD decoding by applying the characteristics of corresponding channel to the symbols (x1, x2), (−x2*, x1*) arriving at the first receiving antenna 110, and applying the characteristics of corresponding channel to the symbols (x1, x2), (−x2*, x1*) arriving at the N-th receiving antenna 112 respectively. Because the symbols at the first and the second receiving antennas 110 and 112 can be compared with each other, more accurate decoding can be provided. The symbols output from the STTD decoder 118 are fed to the detector, and the detector detects the fed symbols. In case of a system that transmits and receives data via multiple transmitting and receiving antennas, the receiving antenna obtains the transmitted signal by combining signals transmitted from the transmitting antennas.

Meanwhile, it is assumed that a plurality of transmitting antennas transfers different signals and a receiving antenna receives a signal from one of the plurality of the transmitting antennas. In detail, the first receiving antenna should receive a signal only from the first transmitting antenna, and the N-th receiving antenna should receive a signal only from the N-th transmitting antenna. However, the first receiving antenna may receive signals from the second through N-th transmitting antennas. In this case, the signals from the second and N-th transmitting antennas act as noise or interference signals. As a result, a novel method is demanded to remove the MAI components from multiuser interference and suppress multipath channel interference at the same time.

SUMMARY OF THE INVENTION

Aspects of the present invention provide a space-time multiuser detector and detection method for removing MAI components that is multiuser interference and multipath channel interference.

According to the above aspects of the present invention, there is a space-time multiuser detector having multiple transmitting and receiving antennas, which includes a plurality of receiving antennas; a channel estimator which estimates signals received via the receiving antennas; a space-time diversity decoder which performs space-time decoding with respect to the signals provided from the channel estimator and performs diversity combination; a signal aligner which aligns the signals provided from the space-time diversity decoder; and a successive interference cancellation detector which generates an interference signal from the signals that are provided from the signal aligner one by one in sequence, and removes the interference signal from the received original signals.

In accordance with the above aspects of the present invention, a space-time multiuser detection method a having multiple transmitting and receiving antennas, includes estimating signals received via a plurality of receiving antennas; performing space-time decoding to the estimated signals and performing diversity combination; and aligning the signals that pass through the diversity combination; and generating an interference signal from the signals received one by one in sequence, and removing the interference signal from the received original signals.

BRIEF DESCRIPTION OF THE DRAWING FIGURES

These and/or other aspects of the invention will become apparent and more readily appreciated from the following description of exemplary embodiments, taken in conjunction with the accompanying drawings of which:

DETAILED DESCRIPTION OF THE EXEMPLARY EMBODIMENTS

Figure 1:
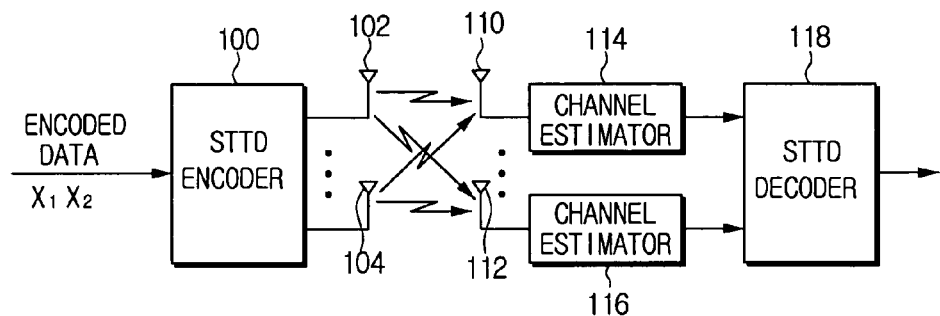
FIG. 1 is a block diagram of a conventional transmitting end which transmits data via a plurality of transmitting antennas, and a conventional receiving end which receives the data via a plurality of receiving antennas.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 2:
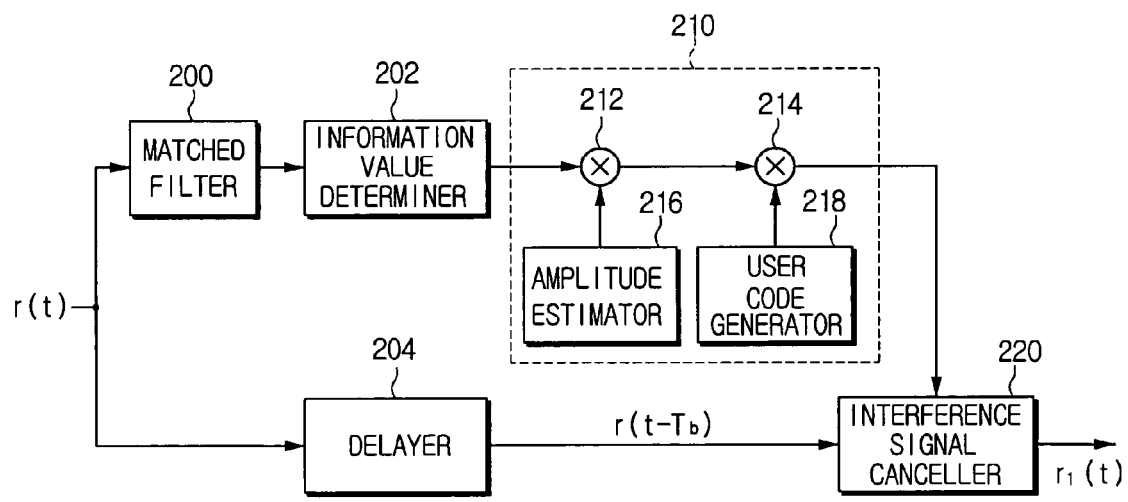
FIG. 2 is a block diagram of a SIC detector.

FIG. 2 is a block diagram of a successive interference cancellation (SIC) detector. Configuration and operation of the SIC detector are provided below in reference to FIG. 2.

Referring now to FIG. 2, the SIC detector includes a matched filter 200, an information value determiner 202, an interference signal generator 210, a delayer 204, and an interference signal canceller 220. The interference signal generator 210 includes multipliers 212 and 214, an amplitude estimator 216, and a user code generator 218.

The matched filter 200 detects a signal having the highest intensity among the received signals, by matched filtering an incoming original user signal r(t). The matched filter 200 provides the detected signal to the information value determiner 202. The information value determiner 202 determines an information value d1 of the signal detected at the matched filter 200, and provides the determined information value to the outside and the interference signal generator 210 at the same time.

The interference signal generator 210 generates an interference signal based on the information value d1 determined at the information value determiner 202 by using relevant user information such as a pseudo random number (PN) code. The relevant information also include the amplitude and the user code (scrambling code used at a transmitting end, e.g., the PN code) that are supplied from the amplitude estimator 216 and the user code generator 218, respectively. Specifically, the multiplier 212 multiplies the information value d1 received from the information value determiner 202 and the estimated amplitude together, and the multiplier 214 multiplies the signal output from the multiplier 212 and the user code together, to thus generate the interference signal.

The delayer 204 delays the original signal r(t) by a certain time $T_b$ and outputs the delayed signal $r(t-T_b)$. The interference signal canceller 220 removes the interference signal received from the multiplier 214 from the delayed signal $r(t-T_b)$ provided from the delayer 204 and outputs the interference free signal $r_1(t)$.

As such, the SIC detector removes the multiple access interference in sequence. To forward the more mitigated multiple access interference signal to a next stage, the SIC detector consecutively removes one user signal from the original signal by estimating the amplitude of the determined bit signal.

Figure 3:
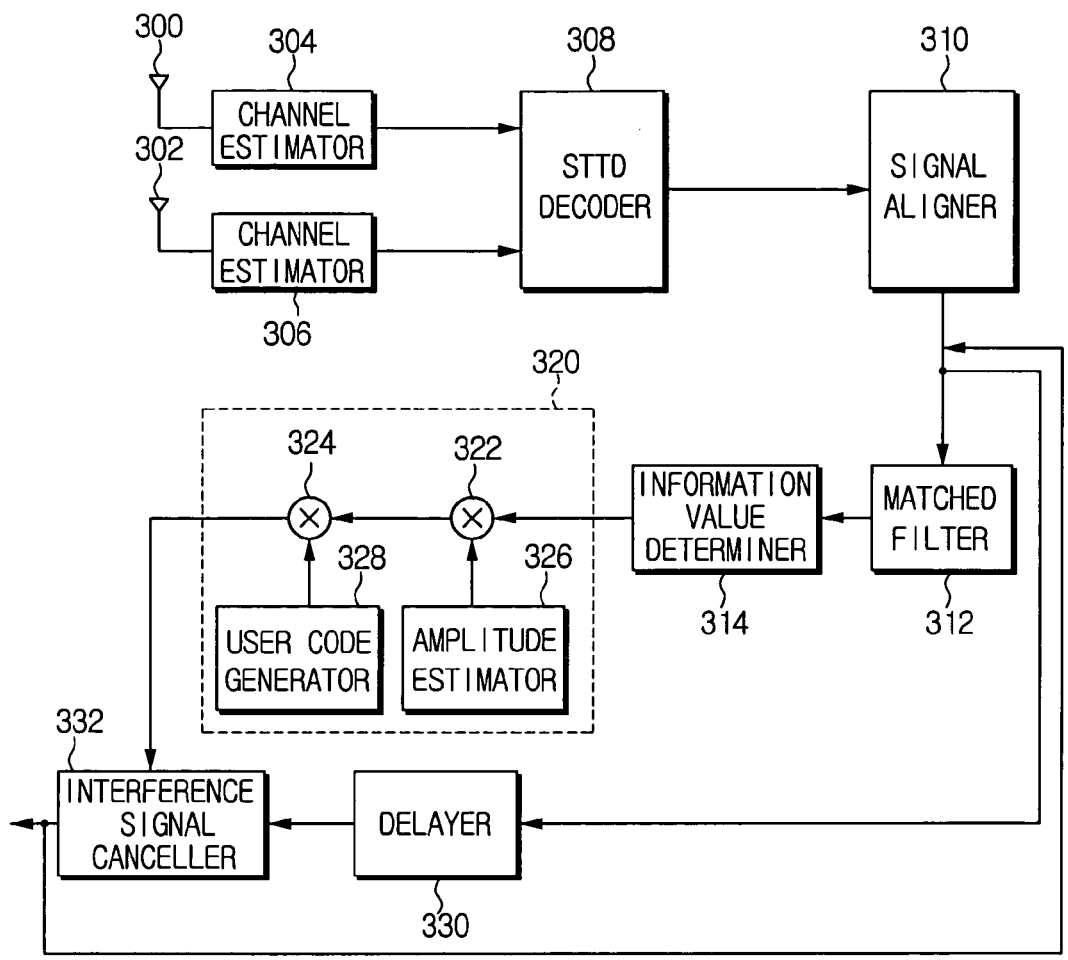
FIG. 3 is a block diagram of a space-time SIC multiuser detector according to an exemplary embodiment of the present invention.

FIG. 3 is a block diagram of a space-time successive multiuser detector according to an exemplary embodiment of the present invention. Referring to FIG. 3, the space-time successive multiuser detector includes first and second receiving antennas 300 and 302, first and second channel estimators 304 and 306, a STTD decoder 308, a signal aligner 310, a matched filter 312, an information value determiner 314, an interference signal generator 320, a delayer 330, and an interference signal canceller 332. The interference signal generator 320 includes first and second multipliers 322 and 324, an amplitude estimator 326, and a user code generator 328. The following description sets forth configuration and operation of the space-time successive multiuser detector in reference to FIG. 3.

Signals received at the first receiving antenna 300 are provided to the first channel estimator 304, and signals received at the second receiving antenna 302 are provided to the second channel estimator 306. If there are a plural number of transmitting antennas, each of the first and the second receiving antennas 300 and 302 receives the signal from all of the transmitting antennas. For example, in the event that the number of the receiving antennas is two and the number of transmitting antennas is two, the first receiving antenna 300 receives the signals from both the first and second transmitting antennas. Likewise, the second receiving antenna 302 receives the signals originating from the first and second transmitting antennas.

The first channel estimator 304 estimates a channel with respect to the signals received from the first receiving antenna 300 and the second channel estimator 306 estimates a channel with respect to the signals received from the second receiving antenna 302, respectively. The first and second channel estimators 304 and 306 estimate channels with respect to a plurality of received signals, respectively. Accordingly, the signal received through the same channel is estimated by the first and second channel estimators 304 and 306, and more accurate channel estimation is provided.

The signals estimated at the first and second channel estimators 304 and 306 are fed to the STTD decoder 308. As mentioned earlier, the usage of the plurality of the receiving antennas, rather than a single receiving antenna, provides better performance. Thus, better performance can be attained by receiving and determining signals via the plurality of the receiving antennas. Although only two receiving antennas are illustrated in FIG. 3, the number of the receiving antennas is variable according to a preference of a user. For example, in another exemplary embodiment, there are three receiving antennas. In yet another exemplary embodiment, there are more than three receiving antennas. In case that the number of the receiving antennas changes, the number of the channel estimators also changes in proportion. In one exemplary embodiment, the number of channel estimators change in direct proportion.

When the first and second channel estimators 304 and 306 estimate channels with respect to the respective signals, the signals along with channel characteristics are provided to the STTD decoder 308. The STTD decoder 308 decodes the received signal by applying the channel characteristics provided by the first and second channel estimators 304 and 306. More specifically, the STTD decoder 308 applies channel characteristics estimated by the first channel estimator 304 with respect to the signals received at the first receiving antenna 300, and applies channel characteristics estimated by the second channel estimator 306 with respect to the signals received at the second receiving antenna 302. The STTD decoder 308 forwards the decoded signals to the signal aligner 310. The signal aligner 310 aligns the received signal in a preset order. For example, the signal aligner 310 measures the reception power of the signals and arranges the signals in the order of their measured reception power. Each signal contains PN code, which is the code about a user of a mobile communications system. Specifically, the PN code is used to spread a signal for spread spectrum communication. The signal aligner 310 compares each of the spread signals with the PN codes which are provided from the base station upon turning on the corresponding mobile communications device. By doing so, the signal aligner 310 determines which one of the received spread signals correspond to the PN code of the desired signal to ultimately identify the desired signal from the received spread signals. Further, the signal aligner orders all the received signals according to the known reception power of each of the signals received by the mobile communications device. Because the reception power for the signal desired by the mobile communications device is known, the desired signal can be easily extracted by removing the signals having a reception power that is higher than the reception power of the desired signal. For example, if a signal in the fifth order of reception power, i.e., the signal with the fifth-highest reception power, is desired among the ten received signals, signals in the first through fourth order of reception power are considered to be the interference signals and removed, and thus the desired signal can be extracted. The process of extracting interference signal through the matched filter 312, the information value determiner 314 and the interference signal generator 320, and removing the interference signal from the signal delayed at the delayer 330, is repeated to remove interference signals from the inputted signal.

Meanwhile, when the order of received signals is determined based on the intensity of reception power, the signals are altogether forwarded to the matched filter 312.

The matched filter 312 filters the forwarded signals and only outputs the signal with highest power among the received signals. In other words, the matched filter 312 outputs the signal of first order of reception power. The matched filter 312 can use a variety of ways to extract the signal of the highest reception power. For example, the matched filter 312 may multiply the PN code of the signal in the first order of reception power at the signal aligner 310 by the signal received from the signal aligner 310, to thus despread the signal and output signal of the first order of reception power.

The signal of the first order of reception power, which is output from the matched filter 312 is fed to the information value determiner 314. The information value determiner 314 determines an information value of the signal detected at the matched filter 312. The "information value" is determined based on the bit values of the signals. When the information value is determined by the information value determiner 314, the information value is provided to the outside and to the interference signal generator 320 at the same time.

The interference signal generator 320 generates an interference signal based on the information value determined at the information value determiner 314 by using the amplitude and the user code provided from the amplitude estimator 326 and the user code generator 328. In more detail, the first multiplier 322 multiplies the information value of the information value determiner 314 and the estimated amplitude of the amplitude estimator 326 together and outputs the result of the multiplication. The "estimated amplitude" is generally determined during the transmission and reception of the mobile communications signal, and the amplitude estimator 326 provides a proportion of the amplitude so that signals can be amplified appropriately. The second multiplier 324 multiplies the signal, which is amplified by the first multiplier 322 to the amplitude of the original signal, and the user code of the user code generator 328 together, and thus the interference signal is generated. The user code generator 328 provides the PN code as the user code, and as the second multiplier 328 multiplies the PN code, the signals are spread. By the above processes, the signal of highest reception power can be extracted from the signals inputted from the signal aligner 310, and such signal is considered to be the interference signal with respect to the desired signal.

Meanwhile, the delayer 330 delays the signals received from the signal aligner 310 by a certain time $T_b$ and outputs the delayed signal. The certain time $T_b$ is substantially equivalent to the time it takes for the signal inputted to the matched filter 312 to be processed by the matched filter 312, the information value determiner 314 and the interference signal generator 320. The interference signal canceller 332 removes the interference signal generated at the second multiplier 324 from the delayed signal and thus, outputs the signals from which the signal of highest reception power is removed.

The signals outgoing from the interference signal canceller 332, that is, the signals from which the signal of highest reception power is removed, return to the matched filter 312, and the matched filter 312 filters the received signals to output the signal with the second highest reception power. More specifically, the matched filter 312 multiplies the PN code of the signal with the second highest reception power, by the output signal from which the first highest reception power is removed, and thus despreads the output signal. As a result, a signal with the second highest reception power alone is outputted. The signal from the matched filter 312 is provided to the information value determiner 314, and the information value determiner 314 outputs information value of the signal with the second highest reception power. The information value is provided to the first multiplier 322, and when the proportion of amplitude is provided by the amplitude estimator 326 to amplify the signal to the reference amplitude of the mobile communications signal, the information value is multiplied by the provided proportion of amplitude. The result of amplifying the information value is provided to the second multiplier 324, and multiplied by the PN code of the signal having the second highest reception power provided from the user code generator 328, thus generating interference signal.

The interference signal is provided to the interference signal canceller 332, and to the interference signal canceller 332, and the signal, which is removed of the signal of first highest reception power and delayed by the delayer 330, is inputted. The interference signal canceller 332 removes interference signal from the signal which is delayed at the delayer 330, and thus outputs the signal from which the signal of the second highest reception power is removed.

Signals of the third highest reception power and the fourth highest reception power are removed from tile original signal by the same process. As a result, the signal of the fifth highest reception power, which has the information value desired by the mobile communications devices, can be extracted. The signals of sixth to tenth reception power, which are weaker than the signal of the fifth reception power, do not need to be removed.

Figure 4:
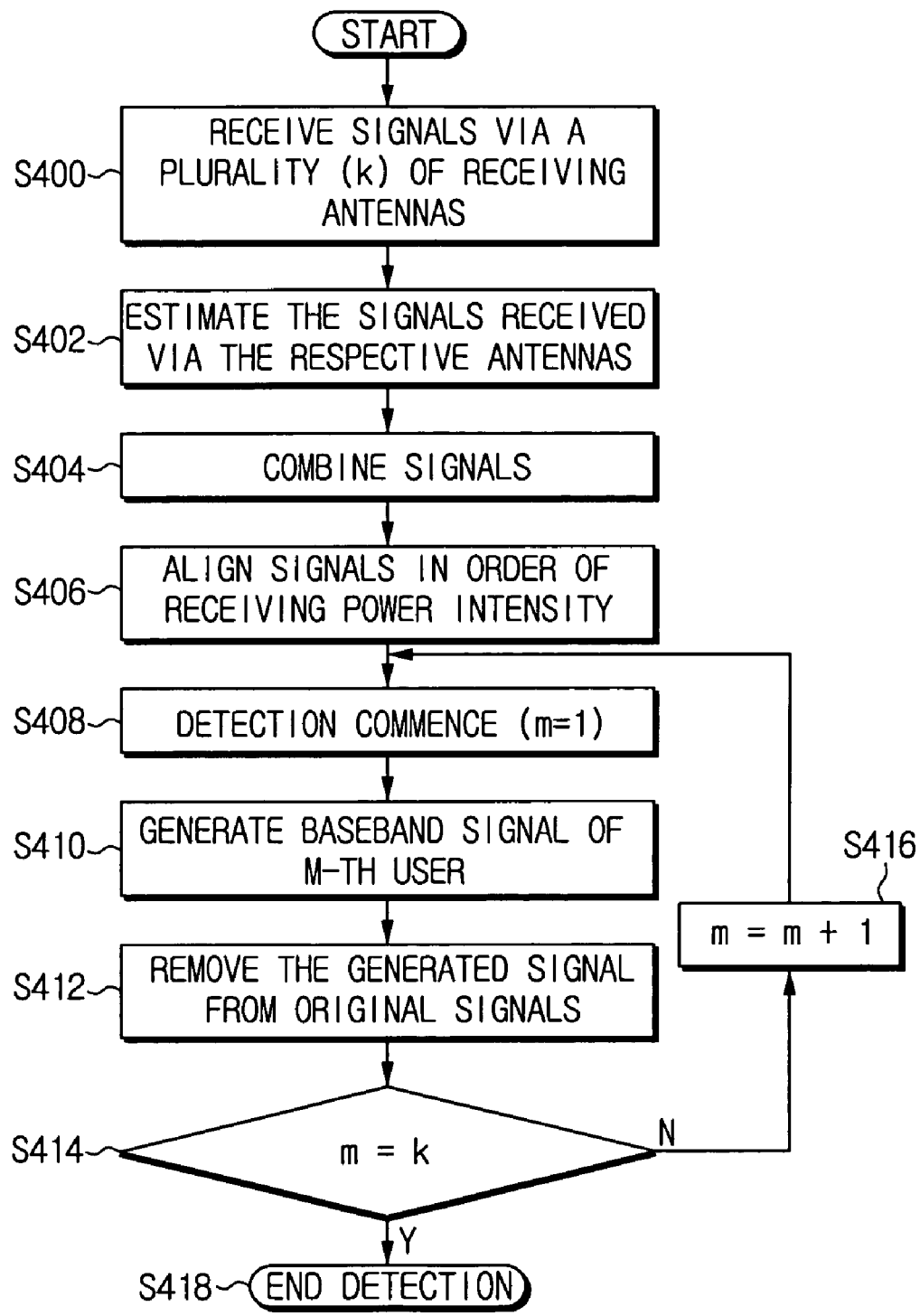
FIG. 4 is a flowchart outlining an operation of the space-time SIC multiuser detector according to an exemplary embodiment of the present invention.

FIG. 4 is a flowchart outlining an operation of the space-time successive multiuser detector according to an exemplary embodiment of the present invention, which will be elucidated below.

Signals are received from the transmitting antennas via the first and the second receiving antennas 300 and 302 of the plurality of the receiving antennas of the space-time successive multiuser detector (S400). By way of example, the number of the receiving antennas is set to m in FIG. 4. In FIG. 4, the K-th signal is the desired signal.

The first and the second channel estimators 304 and 306 estimate the channel of the respective signals received via the first and the second receiving antennas 300 and 302 (S402). The space-time successive multiuser detector decodes the signals received via the receiving antennas using the estimated channel characteristics (S404).

The signal aligner 310 aligns the decoded signals in the order of the receiving power (S406). That is, the m-nary received signals are arranged in the order of the receiving power.

The space-time successive multiuser detector commences the detection (S408). At operation S408, the detection is conducted starting from the signal having the greatest receiving power (m=1) in sequence so that signals can be removed in the order as aligned by the signal aligner 310.

The signals, which are aligned in the order of receiving power, are processed through the matched filter 312, the information value determiner 314 and the interference signal generator 320, and as a result, the space-time successive multiuser detector generates the interference signal, which is a baseband signal of m=1 user.

The interference signal canceller 332 removes the interference signal by subtracting the generated interference signal from the original signal (S412). The space-time successive multiuser detector determines whether m=K (S414). As K is the order of receiving power as desired by the mobile communications device, m=K means that all the interference signals of receiving power higher than desired, are removed from the original signal. According to a result of the determination, when m=K, the space-time successive multiuser detector proceeds to operation S418, where the operation ends. When m≠K, the space-time successive multiuser detector proceeds to operation S416 where m is increased by 1 and the above operations for removing the interference signal are repeated. The space-time multiuser detector can remove multiple access interference and multipath channel interference at the same time in CDMA systems according to IS-95. Better performance can be attained than the conventional single user detector, it is possible to increase the number of subscribers.

The space-time successive interference cancellation detector facilitates the implementation of actual systems by reducing the computations in comparison with the conventional space-time decorrelator and the conventional space-time MMSE detector. Also, it is efficient in view of the complexity to take advantage of two transmitting and receiving antenna system. Therefore, increasing number of subscribers can be serviced, and the present invention is applicable to multimedia communications, such as third generation and fourth generation communication systems, with improved performance.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A space-time multiuser detector having multiple transmitting and receiving antenna, comprising:
a plurality of receiving antennas which receive a corresponding plurality of original signals;
a plurality of channel estimators which estimate channels of the plurality of original signals;

a space-time diversity decoder which performs space-time decoding with respect to the plurality of original signals using the characteristics of the estimated channels and performs diversity combination to generate decoded signals;

signal aligner which aligns the decoded signals according to a predetermined reference to generate aligned signals; and a successive interference cancellation detector which receives the aligned signals and generates one or more interference signal, and removes the interference signals from the aligned signals.

2. The space-time multiuser detector of claim 1, wherein the signal aligner measures reception powers of the decoded signals and aligns the decoded signals in an order of reception power.

3. The space-time multiuser detector of claim 1, wherein the successive interference cancellation detector comprises:

a matched filter which filters the aligned signals to output one of aligned signals having the highest reception power as a resultant signal;

an information value determiner which determines an information value of the resultant signal output;

an interference signal generator which generates a first interference signal of the interference signals using the information value;

a delayer which delays the aligned signals received from the signal aligner by a predetermined time to generate delayed signals; and an interference signal canceller which removes the first interference signal from the delayed signals.

4. The space-time multiuser detector of claim 3, wherein the delayer delays the aligned signals or signals provided from the interference signal canceller by a time taken by the aligned signals output from the signal aligner to pass through the matched filter, the information value determiner, and the interference signal generator.

5. The space-time multiuser detector of claim 3, wherein the interference signal generator comprises:

an amplitude estimator which estimates an estimated amplitude for varying the information value in accordance with a predetermined amplitude;

a first multiplier which multiplies the information value and the estimated amplitude together;

a user code generator which generates a user code corresponding to a signal output from the first multiplier; and a second multiplier which multiplies the signal output from the first multiplier and the user code together.

6. The space-time multiuser detector of claim 3, wherein interference signal canceller outputs the signals, from which the first interference signal is removed, back to the matched filter so that a new interference signal is generated from the signals having the reception power of the following order, and delays the signals, from which the first interference signal is removed, to remove the new interference signal.

7. The space-time multiuser detector of claim 6, wherein the operation of feed-backing the signals, from which the interference signals are removed, generating new interference signals and removing the new interference signals, is repeated until the signals having the reception power higher than a desired signal among the aligned signals, are all removed.

8. A space-time multiuser detection method having multiple transmitting and receiving antennas, comprising:

estimating, by a channel estimator, signals received via a plurality of receiving antennas;

performing space-time decoding of the estimated signals using characteristics of estimated channels and performing diversity combination to generate diversity-combined signals; and aligning the diversity-combined signals according to a predetermined reference to generate aligned signals; and generating interference signals from the aligned signals one by one in a sequence, and removing the interference signals from the diversity-combined aligned signals.

9. The space-time multiuser detection method of claim 8, wherein the operation of aligning the diversity-combined signals measures reception powers of the diversity-combined signals and aligns the diversity-combined signals in an order of the reception powers.

10. The space-time multiuser detection method of claim 8, wherein the operation of removing the interference signals comprises:

filtering the aligned signals to output a signal having a greatest reception power;

determining an information value of the signal having the greatest reception power;

generating a first interference signal of the interference signals using the information value;

delaying the aligned signals for a predetermined time to generate delayed signals; and removing the first interference signal from the delayed signals.

11. The space-time multiuser detection method of claim 10, wherein the operation of delaying the aligned signals delays the aligned signals for a time taken by the aligned signals output from the signal aligner to pass through the matched filter, the information value determiner, and the interference signal generator.

12. The space-time multiuser detection method of claim 11, wherein the operation of generating the interference signals comprises:

multiplying the information value and an estimated amplitude together to output a multiplied signal; and multiplying the multiplied signal and a user code of the multiplied signal together to output the first interference signal.

13. The space-time multiuser detection method of claim 12, further comprising:

filtering the signals, from which the first interference signal is removed, to output the signals having the reception power of following order;

delaying the signals, from which the first interference signal is removed, for a predetermined time;

generating a new interference signal by using the filtered signals; and removing the new interference signal from the delayed signals.

14. The space-time multiuser detection method of claim 12, wherein the operations from the filtering to removing are repeated until the signals having the reception power higher than a desired signal among the aligned signals, are all removed.

15. The space-time multiuser detection method of claim 14, wherein the order of reception power is a decreasing order of reception power.

* * * * *